Feb. 20, 1923.                                             1,446,149.
            W. J. BENOIT ET AL.
            RING TESTING MACHINE.
              FILED JULY 16, 1921.                    2 SHEETS—SHEET 1.

Feb. 20, 1923.

W. J. BENOIT ET AL.
RING TESTING MACHINE.
FILED JULY 16, 1921.

INVENTORS
Wilfred J. Benoit
George R. Pierce
BY Ernest Hays
ATTORNEYS

Patented Feb. 20, 1923.

1,446,149

UNITED STATES PATENT OFFICE.

WILFRED J. BENOIT, OF DRACUT, AND GEORGE L. PIERCE, OF LOWELL, MASSACHUSETTS.

RING-TESTING MACHINE.

Application filed July 16, 1921. Serial No. 485,213.

*To all whom it may concern:*

Be it known that we, WILFRED J. BENOIT, of Dracut, and GEORGE L. PIERCE, of Lowell, in the county of Middlesex and State of Massachusetts, citizens of the United States, have invented a new and useful Improvement in Ring-Testing Machines, of which the following is a specification.

The necessity for making spinning rings which shall be absolutely true is well known among spinners and the makers of spinning machinery, but it also well known that in the finishing of a ring especially in hardening it the ring often becomes distorted. While the distortion is usually slight, it is sufficient to cause the ring to do imperfect work even if the distortion is so slight that it cannot be perceived by any ordinary method now in use.

Our invention relates to a machine for testing a ring and indicating such imperfections more accurately than heretofore, and it will be understood by reference to the drawings in which it is shown in its preferred form.

Figure 1:
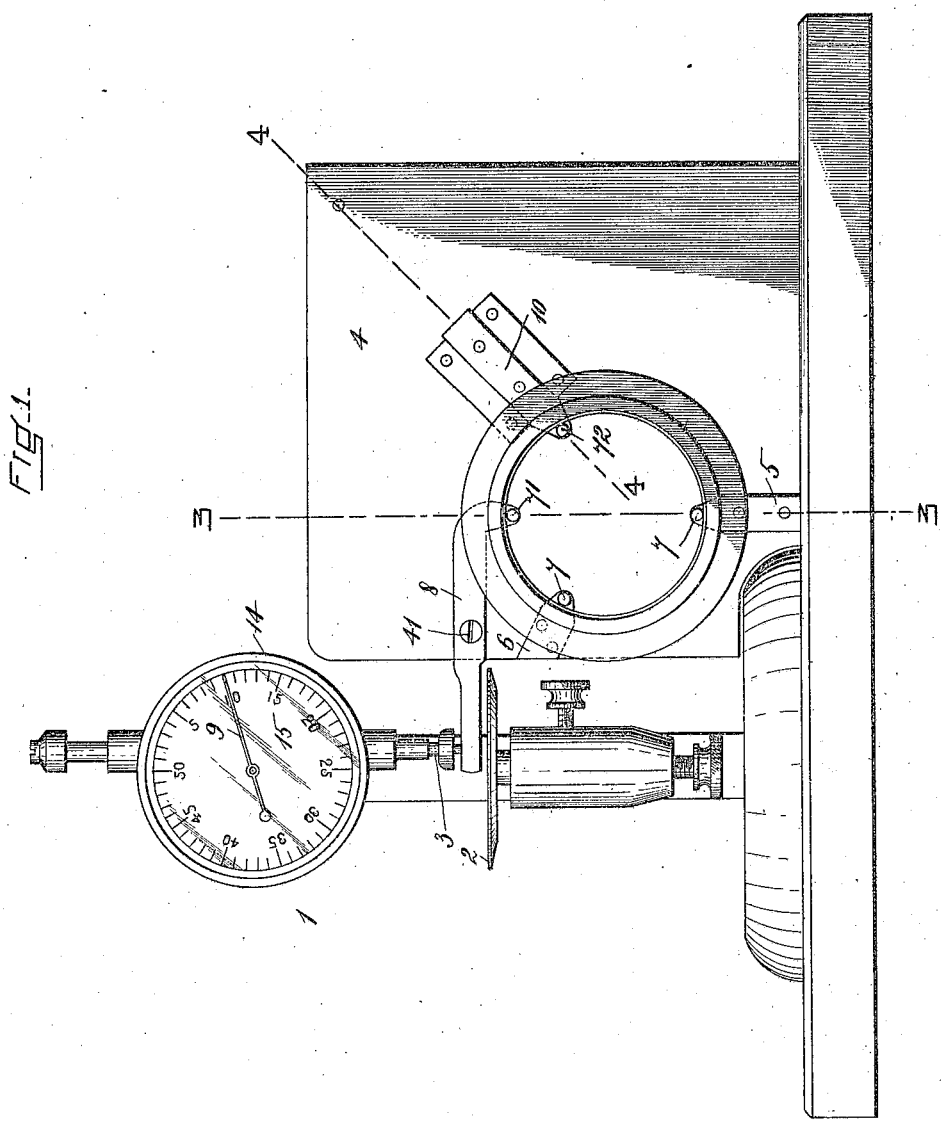
Figure 1 is a front elevation of a machine embodying our invention showing a ring in position to undergo test.
Figure 3:
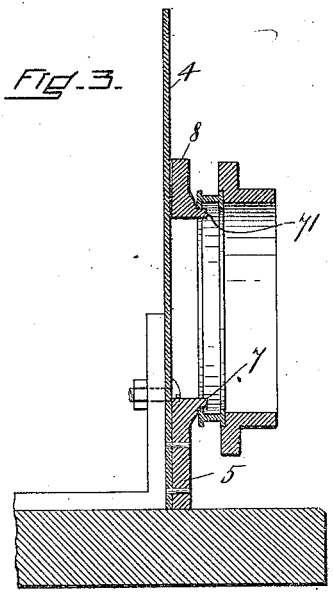
Figure 4:
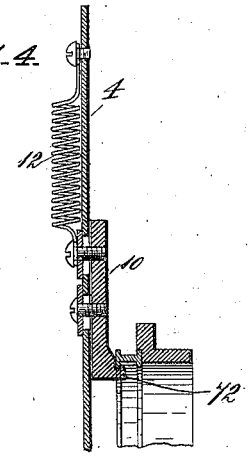

Figs. 3 and 4 are enlarged sections on lines 3—3 and 4—4 of Fig. 1.

1 is an instrument for measuring thicknesses, for example, of paper or the like. Such machines are well known and the particular type of machine which we have utilized in carrying out our invention is a gauge made to measure 1/1000 of an inch, for which patent was granted to J. Logan, August 21, 1883, No. 283,627.

Figure 2:
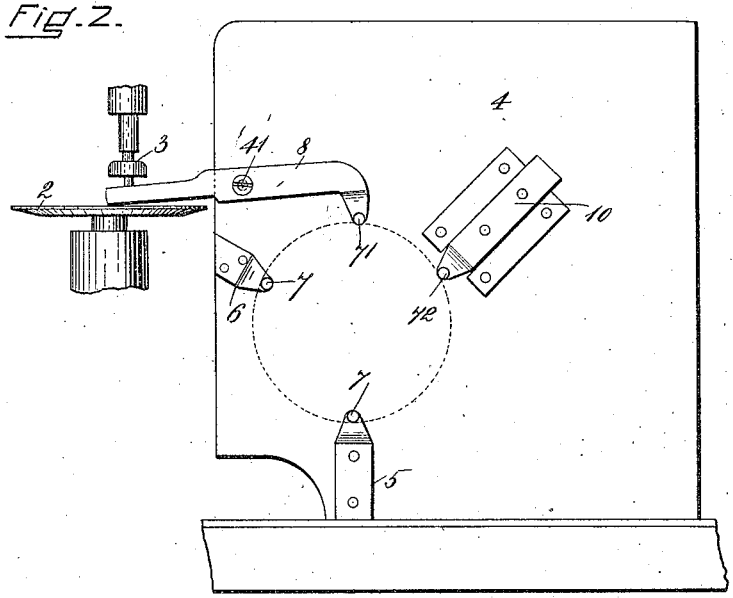
Fig. 2 is an elevation of the ring-holding mechanism, enlarged.

2 is the platen of the machine and 3 is the vertical rod which is adapted to rest upon the material the thickness of which is to be measured and which operates the dial hand 9 by means of mechanism contained in the casing 14 to indicate on the dial 15 the movement of the hand. The figures on the dial may indicate any desired units. 4 is a vertical plate carrying four ring holders of which 5 and 6 are two stationary members each carrying a finger 7 which is adapted to engage the interior periphery of the ring as shown in Fig. 1 and indicated in Fig. 2. 8 is a lever pivoted to the plate 4 at 41 and carrying at one end a finger 71, the other end extending under the rod 3. This lever being moved out of its normal position lifts the rod 3 and consequently operates the hand 9 on the dial 15 and thus indicates any change from normal in the position of the lever. 10 is a sliding holder also carrying a finger 72 and held in its upper or gripping position by means of the spring 12.

In practice the ring 13 is placed upon the fingers 7, 71, 72, possible because of the spring-controlled slide which carries the finger 72 and the fact that the lever 8 which carries finger 71 may be moved. The ring is thus centered by the fingers 7, 71, 72 and may then be turned by hand. The finger 71 adjusts itself within the ring and also the position of the hand 9 in accordance with the dimensions of the ring, and if on turning the ring its interior surface is a true circle, the position of the hand 9 does not change. But if the surface is not a true circle the finger 71 is moved accordingly as the ring is turned so that the hand 9 is moved and on observing it may be determined whether the ring which is being tested is up to the standard or not. A very slight variation from a mathematically true circle is allowable and is usual, but our device shows whether that variation has been exceeded or not. It will be seen that every irregularity in the internal diameter of the ring causes a movement of the lever 8 by which the hand is moved and, as this hand measures a lift of the rod of 1/1000 of an inch, it will be seen that these irregularities may be very carefully determined.

While other measuring devices may be substituted for that shown, we have found the gauge above referred to well adapted for the purpose, but we do not mean to limit ourselves to the precise details of construction above described, as our invention primarily relates to a movable member adapted when moved to operate a gauge and so indicate the amount of its movement, all arranged for the measuring of variations in the circular formation of a ring.

What we claim as our invention is:—

1. In a ring testing machine, the combination with means for holding the ring so that it may be turned about its axis and for centering said ring as it is turned, of means for indicating and measuring any inaccuracies in the inner face of the ring as it is turned.

2. In a ring testing device, the combination with means for holding the ring so that it may be turned about its axis, of a pivoted lever having a portion adapted to engage the inner face of the ring as the latter is turned, and means to indicate any movement of the lever about its pivot due to irregularities in the surface of the ring.

3. In a ring testing device, the combination with means for holding the ring so that it may be turned about its axis, of a pivoted lever having a portion adapted to engage the inner face of the ring as the latter is turned, and a gauge actuated by the movement of the lever and arranged to indicate any turning movement thereof due to irregularities in the surface of the ring.

WILFRED J. BENOIT.
GEORGE L. PIERCE.